United States Patent [19]
Anschutz

[11] 3,855,038
[45] Dec. 17, 1974

[54] METHOD AND ARRANGEMENT FOR JOINING THE ENDS OF THERMOPLASTIC PROFILES BY HEAT-WELDING

[76] Inventor: Otto Anschutz, Im Rosental, 547 Andernach, Germany

[22] Filed: Feb. 8, 1973

[21] Appl. No.: 330,862

[30] Foreign Application Priority Data
Mar. 10, 1972 Germany.............................. 2211548

[52] U.S. Cl.................. 156/499, 156/304, 156/306, 156/502
[51] Int. Cl............................................. B32b 31/20
[58] Field of Search .......... 156/304, 311, 322, 433, 156/581, 583, 228, 306, 499, 502

[56] References Cited
UNITED STATES PATENTS
3,472,721   10/1969   Abramson et al. ................. 156/366
2,379,500   7/1945   Steffens ......................... 156/304 X

*Primary Examiner*—William A. Powell
*Assistant Examiner*—Brian J. Leitten
*Attorney, Agent, or Firm*—Michael S. Striker

[57] ABSTRACT

The ends of thermoplastic profiles to be joined are placed into contact with a heated element so that the thermoplastic material will be softened. During this softening the outward displacement of the thermoplastic material beyond the outer contour of the respective profile is prevented. Upon softening the ends are moved out of contact with the heated element and are placed into abutment with one another. During the subsequent hardening of the softened material outward displacement beyond the outer contour of the profiles is again prevented.

12 Claims, 10 Drawing Figures

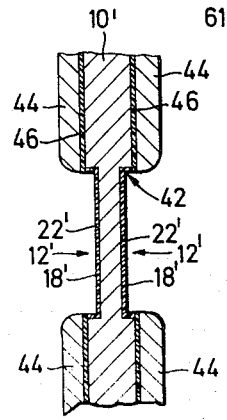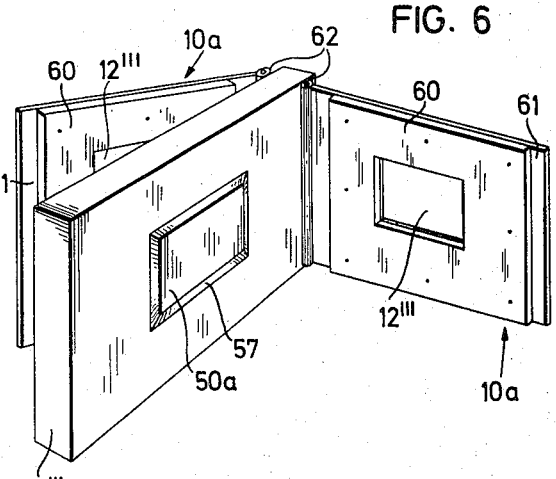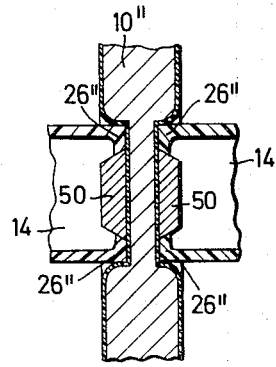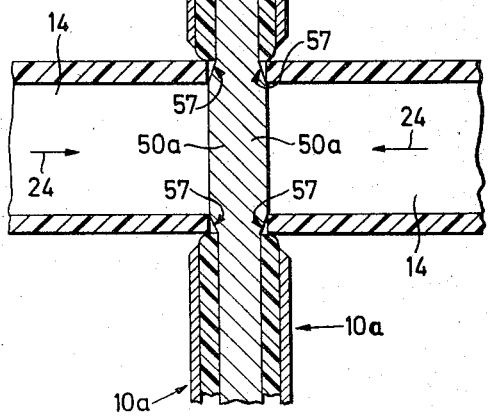

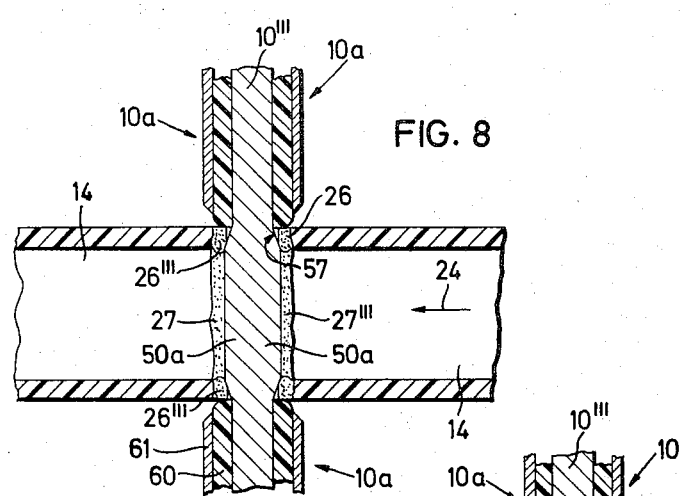
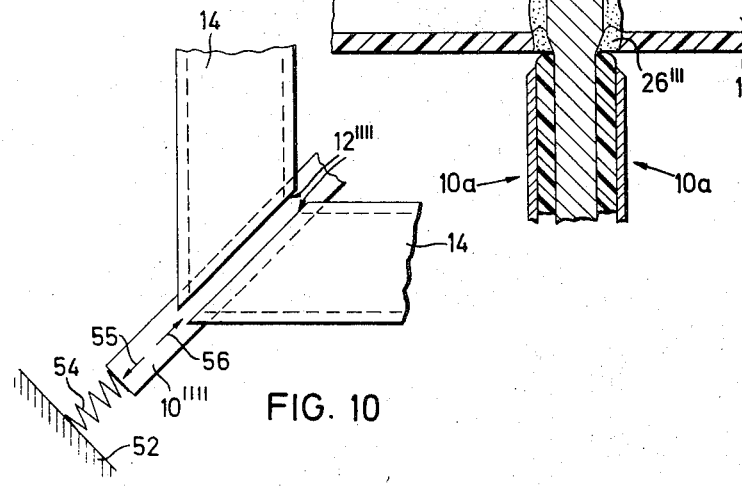
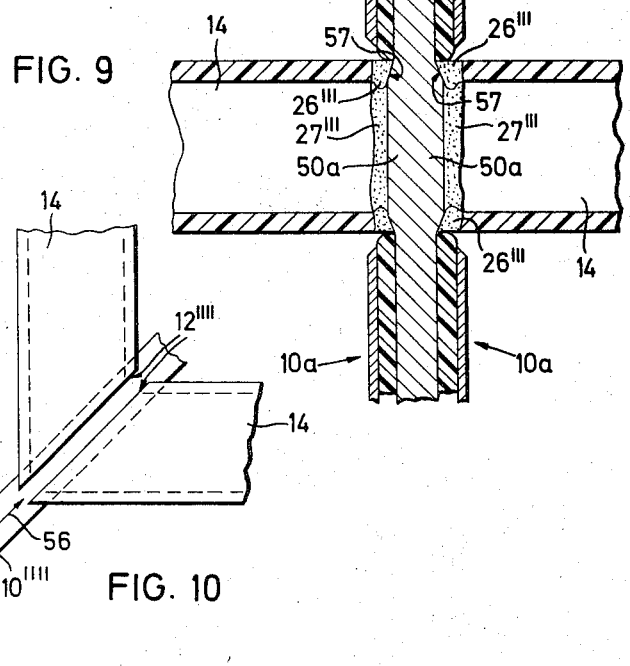
FIG. 8
FIG. 9
FIG. 10

METHOD AND ARRANGEMENT FOR JOINING THE ENDS OF THERMOPLASTIC PROFILES BY HEAT-WELDING

BACKGROUND OF THE INVENTION

The present invention relates generally to joining of thermoplastic profiles by heating, and more particularly to a method of joining the ends of such thermoplastic profiles and to an arrangement for carrying out the method.

In many instances it is necessary to join thermoplastic profiles, by connecting their ends. It is known to do this by heating the material of the ends so that the material becomes softened, whereupon the ends are pressed together so that the softened material of the ends will be in contact and will remain in contact until it has cooled and hardened, thereby uniting the profiles with one another. For the purpose of heating the ends so as to soften their material, it has been proposed to provide infrared or other radiation, to contact the ends with a heated element, to play a flame over the ends or to use induction heating. However, all of these proposals have certain significant disadvantages.

If infrared or other radiation is utilized for heating the material to the softening point the edges of the ends which are to be joined are heated predominantly, and will become overheated by the time the material intermediate the edges can reach a sufficient temperature at which it will soften subsequent uniting.

The result is that if heating is carried to the point where the material intermediate the edges will be sufficiently soft, the material at the edges will be overheated and will be thermally damaged. This in turn leads to the end result that a heat-welded connection between the ends which have been so heated will not be sufficiently strong.

Another approach, namely to play a flame on the ends to heat the material thereof, is only theoretically usable, and in practice cannot be employed because it will lead to inevitable dirtying of the ends which cannot be later rectified.

If the ends are moved into contact with a heated element, then experience has shown that during the softening process, the softening thermoplastic material will yield in outward direction of the profile, forming a bead which in almost all instances is unacceptable and must be avoided.

Finally, the proposed use of induction heating produces the same difficulties as if one were to use infrared or other radiation, and in addition it is rather complicated and expensive. Moreover, the heating elements used for this purpose tend to weaken the profiles which are to be joined by welding.

All in all, these prior-art proposals have not found any use in actual practice. What has been used heretofore in the art is an apparatus having a frame on which several workpiece carriers are slidably mounted, each adapted to engage one of the profiles to be connected. Usually the carriers are angularly spaced by 90° relative to one another, so that two profiles can either be connected in abutment and in axial alignment, or at right angles, or so that three or four profiles can be connected in a crosswise arrangement in form of a "T" or the like. A heating plate is movably mounted on the frame and can be inserted between the ends of the profiles engaged by the holders, so that these ends can be pressed from opposite sides against the heating plate in order to heat the material and soften it. Once the softening has taken place the holders are retracted so that the profiles move out of engagement with the heating plate which is then moved out of the way and subsequently the softened ends of the profiles are brought into abutment with one another by appropriate movement of the holders. The heated and softened synthetic plastic material of the abutted ends now becomes joined and, as it cools, it units the ends.

The difficulty with these arrangements which are used in the industry for connecting the ends of thermoplastic profiles by heat welding results from the fact that once the softened material of the profiles is abutted it will form a welding bead which extends outwardly beyond the external contour of the profiles and which must be removed in a subsequent operating step, usually manually by grinding it away and then polishing the area of the joint. This is of course an expensive additional step, and the industry has long sought to eliminate it, but heretofore without success.

SUMMARY OF THE INVENTION

It is, accordingly, an object of the present invention to overcome the disadvantages of the prior art.

More particularly, it is an object of the present invention to provide a novel method of joining the ends of thermoplastic profiles by heating welding without the formation of a welding bead.

Another object of the invention is to provide an arrangement for carrying out the novel method.

In keeping with these objects, and with others which will become apparent hereafter, one feature of my novel invention resides in a method of joining the ends of thermoplastic profiles by heat welding, which method comprises—briefly stated—the steps of placing the ends of profiles to be joined into contact with a heated element so as to soften the thermoplastic material in the region of the ends and preventing outward displacement of thermoplastic material due to softening thereof. The ends are removed from contact with the heated element after the occurrence of the desired softening, whereupon the ends are moved into abutment with one another and the soft material is permitted to harden until the ends are joined. Outward displacement of the softened material during such hardening is prevented.

According to the present invention the ends of the thermoplastic profiles to be joined are heated uniformly and softened over their entire cross-sectional surface, and it is made impossible for the softened material to escape in outward direction and to form the undesirable bead mentioned before. Subsequently, the formation of a similar bead during the joining of the ends is also reliably prevented, so that the finished product does not require the separate operating step heretofore necessary for removing the objectionable bead.

The novel arrangement according to the present invention comprises a heated element having two opposite sides each provided with a recess whose contour corresponds to the exterior contour of the ends to be joined. A welding jig is also provided, similarly having two opposite sides but being provided with a passage which connects these opposite sides and whose contour also corresponds to the exterior contour of the ends which are to be joined. Holding means is provided for holding the profiles to be joined and for moving the ends thereof first into the respective recesses and into contact with the heated element so that the thermoplastic material of the ends softens in response to such contact. Then, the ends are retracted from the recesses and are moved into abutment in the passage of the welding jig, so that the softened material joins the abutted ends in response to its hardening while the ends are located in the aforementioned passage.

According to a currently preferred embodiment, I have found it advantageous if the heated element itself has a heated plate and is provided with two outer plate members each located at one of its opposite sides and each provided with one of the recesses. These outer plate members are then movable with respect to the heated plate into and out of engagement with the same. The advantage of this construction is that when one operation has been completed the movable outer plates can be briefly moved away from the heated plate and can be cleaned—as by wiping—of any thermoplastic material of the profiles which might have adhered to them, before the next operation takes place. This is highly advantageous especially where mass-production is required.

Of course, the outer plates can be made movable with respect to the heated plate in any known or desired manner. They can, for instance, be movably arranged in guides in which they can slide to and from engagement with the heated elements. Currently, however, I prefer to connect them by means of hinges with the heated plate so that they can be moved hingedly to and from engagement with the same. Advantageously these outer plates are either of one piece in form of a plate composed of a material having poor thermal conductivity and being of such characteristic that the softened synthetic thermoplastic material will adhere little or not at all to it. Another possibility, however, provides for such outer plates to be in form of one plate portion of the aforementioned material of poor thermal conductivity, and another plate portion which serves as a carrier and reinforcement for the first-mentioned plate portion whose material is usually not of any particularly good mechanical strength.

It is also possible to have the bottom and possibly a portion of the inner circumferential wall bounding the respective recess adjacent the bottom be directly heated, but to have the remainder of the circumferential wall of the respective recess bounded by thermally insulating material so that it is thermally separated from the bottom and possibly that portion of the circumferential wall which is adjacent the bottom. This may be done by providing a thermally insulating coating on the remainder of the circumferential wall, or by having the entire circumferential wall made of a heat-resistant material of poor thermal conductivity.

To prevent uncontrolled flowing of the softened material in inward direction of the respective profile it is also possible to provide the bottom of the respective recess with a molding or core projection which is inserted into the interior of the respective profile and assures that in the interior the softened material of the profile can flow only to a certain precisely determined extent, forming a widened or enlarged contact surface over which it is heat-welded to a similar contact surface formed in the same manner on the other profile.

If such a projection is provided, then it is particularly advantageous if it is bounded by a circumferentially extending bevelled edge which diverges in direction away from the respective recess bottom and which is so configurated that this edge is located opposite the end face at the end of the respective profile. Because of the inclination of such a bevelled circumferential surface, the heat transmitted by this surface will be transmitted to the wall of the respective profile from the interior towards the exterior of the latter, so that the greatest amount of heat and consequently the strongest softening will be directed to the inner side of the profiles with the result that when the profiles are subsequently abutted and pressed together for joining them, a particularly smooth outer weld seam of excellent strength will be obtained. In addition, these inclined circumferential surfaces on the projections serve to facilitate a particularly advantageous formation and configuration of the portions of the ends which are to be softened, as will be discussed subsequently.

Evidently, it is possible to connect two profiles, or more than two profiles, not only in axial alignment, but also at an angle to one another. Such an angle may for instance be a right angle or an angle of any desired magnitude. If such an angular connection is to be carried out, then it is known that a slight outward movement of the two profiles occurs as the ends of the profiles are pressed against the heated element, that is into the recesses thereof. It is therefore advantageous if at least for an arrangement permitting this type of connection the heated element can be mounted displaceably in its general plane, that is in parallelism with the aforementioned two opposite sides of it, and if biasing means is provided which urges it to a normal rest position. Such biasing means can for instance be in form of a spring. Thus, the heated element can yield somewhat to the pressure exerted by the profile, which is necessary because of the arrangement of the ends of the profiles in the recesses of the heated element, but will return to its normal rest position when the pressure exerted by the profiles is removed as the ends thereof are withdrawn from the recesses.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

FIG. 4 is a fragmentary sectional detail view corresponding to the section II—II of FIG. 1 but illustrating a further embodiment of the heated element;

FIG. 5 is a view similar to FIG. 4 illustrating another embodiment of the invention;

FIG. 6 is a perspective view of still a further embodiment of the heated element;

FIG. 7 is a fragmentary section, on an enlarged scale, through the heated element of FIG. 6 in the operative condition thereof, and also showing two profiles at the beginning of the softening process of their material;

FIG. 8 is a view similar to FIG. 7 but showing the next phase of the softening process of the material of the profiles;

FIG. 9 is a view similar to FIG. 8 showing still a further successive phase of the softening process; and FIG. 10 is a diagrammatic top-plan view of still another embodiment of the invention.

DESCRIPTION OF THE PREFERRED EMBODIMENTS

It is pointed out, before entering into a detailed discussion of the various Figures, that the profiles 14 whose ends are to be joined by heat welding have been illustrated as being hollow profiles of quadratic cross-section. This was done for the sake of simplicity of illustration but it is to be understood that profiles of whatever cross-sectional configuration can be connected in accordance with the present method and utilizing the present arrangement and that the profiles evidently need not necessarily be hollow.

Figure 1:
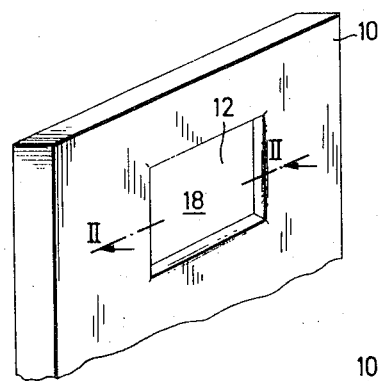
FIG. 1 is a fragmentary perspective view of a heated element in an arrangement according to one embodiment of the invention.
Figure 2:
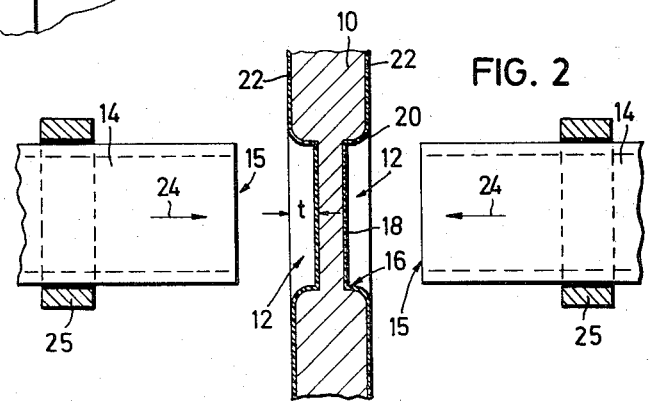
FIG. 2 is a section taken on line II—II of FIG. 1 and further showing profiles to be connected.

With this in mind, and discussing firstly FIGS. 1 and 2, it will be seen that the novel arrangement utilizes a plate-shaped heated element 10 which is heated in suitable manner, for instance by means of interior electrical resistances. Such heaters are too well known to require a discussion and do not in any case form the invention.

According to the invention, however, the opposite sides of the plate 10 are provided with respective recesses 12 whose circumferential contour corresponds precisely to the outer contour of the profiles 14 whose ends are to be joined by welding and which are of synthetic thermoplastic material. FIG. 2 shows particularly clearly that in accordance with an advantageous concept of the invention the inlet of the recesses 12 are bounded by bevelled circumferential surface portions 20 which serve as guides to facilitate the ease of insertion of the end portions 15 of the profiles 14 into the respective recesses 12.

The opposite sides of the plate 10 are provided at their surfaces with coatings 22 of a material which prevents the adherence of the softened thermoplastic material of the profiles 14, and by way of example tetrafluoroethylene is mentioned as a material suitable for this purpose.

The depth of each of the recesses 12 is designated with reference character $t$ in FIG. 2 and may for instance be equal to between ⅓ and ¾ of the thickness of the walls of the profiles 14. However, the depth $t$ is of course to be selected in dependence upon various requirements, including various operating parameters.

In FIG. 2 there are diagrammatically illustrated workpiece holders 25 each of which engages one of the profiles 14 and is movable in the direction of the respective arrow 24 towards and away from the plate 10. Such holders 25 are known per se in the art, and it need merely be pointed out that when they move with the profiles 14 in the direction of the arrows 24, the free end portions 15 of the profiles 14 will enter into the recesses 12 until they come in contact with the bottom wall 18 of the respective recesses. Since the plate 10 is heated, contact with the bottom wall 18 will cause the material of the end portions 15 to become heated and softened. It is clear that when the end portions 15 are located in the recesses 12 in contact with the bottom walls 18 thereof, any outward displacement of the softened material is impossible due to the precise coincidence of the internal contours of the recesses 12 with the external contours of the end portions 15.

Figure 3:
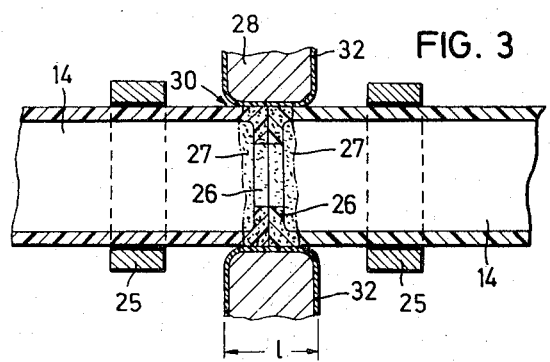
FIG. 3 is a sectional view analogous to that shown in FIG. 2 but illustrating a welding jig in conjunction with two profiles to be connected.

FIG. 3 deals, as will be discussed presently, with the welding jig of the novel arrangement. However, by reference to this Figure it will be seen that when the end portions 15 of the profiles 14 are inserted into the recesses 12 of the heated element or plate 10, there can be a slight formation of an interior bead 26 if the profiles 14 are hollow, due to interior yielding of the softened material which of course is not precluded in the embodiment of FIGS. 1 and 2. However, as already pointed out before, flowing or yielding of the material in outward direction is not possible. It should be noted in FIG. 3 the portion of the end portions 15 which will become heated when the end portions are inserted into the recesses 12 in FIG. 2 is designated with reference numeral 27.

When the material of the end portions in the region 27 has been heated and so become softened, the profiles 14 are retracted by moving the workpiece holders 25 in direction opposite to the arrows 24 of FIG. 2. Thereupon the plate 10 is moved out from between the profiles 14 and is replaced by a welding jig 28 which is fragmentarily shown in FIG. 3 and which is moved into the position that has been vacated by the plate 10. Unlike the plate 10, the welding jig 28 has a passage 30 which does not have a bottom wall but instead extends from one to the other opposite side of the jig 28. In other words, the passage 30 is a through-going passage. The jig 28 and the interior of the passage 30 will advantageously also be provided with a non-stick coating 32, such as for instance tetrafluoroethylene. As in the case of the inlets 20 of the recesses 12 in FIG. 2, the inlets of the passage 30 are advantageously also bevelled to facilitate insertion of the end portions 15 of the profiles 14. The depth $l$ of the passage 30 is at least equal to, but preferably slightly longer than the combined length of the regions 27 of the profiles 14 which are to be connected.

After the welding jig 28 has been moved into place, the workpiece holders 25 are again moved in the direction of the arrows 24 until the end portions 15 enter into the passage 30 and are pressed into abutment with one another within this passage. This causes the softened material of the zones 27 to become intimately contacted and, as it cools and hardens, to unite the profiles 14 with one another. Such abutment takes place under the pressure exerted by the workpiece holders 25. The formation of an outer welding bead due to outward yielding of the softened material prior to hardening thereof is prevented by the fact that the contour of the passage 30 again corresponds precisely to the external contours at the ends of the profiles 14. The result is a welded seam which is completely smooth at the exterior of the joined profiles 14. It should be noted that the welded connection of the two profiles 14 takes place not only over the original area of their circumferential walls where the end portions 15 abut, but also in the region of the inward beads 26 (see FIG. 3) so that the welded connection actually takes place over a larger surface area than if the beads 26 were not present and a better weld is obtained. In continuous operation, the jig 28 tends to heat up and this further improves the appearance at the outer side of the joined profiles 14.

When the welded connection between the profiles 14 has sufficiently cooled so that the material has hardened, the jig 28 is removed. It is conceivable to withdraw the connected profiles 14 in longitudinal direction but it is more advantageous if the jig 28 is of at least two sections which can be withdrawn from one another so as to free the connected profiles 14.

Coming now to FIG. 4 it will be seen that in this Figure there is illustrated in a fragmentary section a somewhat modified heated element 10'. In all other respects it should be understood that the arrangement of FIG. 4 will be the same as that in FIGS. 1–3, that is it will have a welding jig and it will have the holders for the profile 14. Unlike the embodiments of FIGS. 1–3, however, the embodiment of FIG. 4 has a heat element or plate 10' in which the recesses 12' are formed only in part in the plate 10' itself. In particular, the recesses 12' are formed only as to their bottom walls 18' and the adjacent region 42 of the circumferential wall in the plate 10', whereas in the remainder of the circumferential wall is formed in or by outer applied plate portions 44 which are separated from the plate 10' by thermally insulating material 46. In this manner the transmission of heat of the profiles 14 in those portions of the recesses 12' bounded by the plate portions 44 is avoided. The bottom walls 18' are coated with a thermally insulating and non-stick material 22'.

While FIG. 4 shows that the base portions 44 are of thermally conductive material which is separated from the plate 10' by the thermally non-conductive material 46, it is possible to make the plate portions 44 themselves of thermally insulating material, for instance tetrafluoroethylene. In this case it is of course not necessary to provide the material 46 whereas the coating 22' will be used even in this case.

The embodiment of FIG. 5 shows that the plate 10'' provided with the recesses in the manner of the plate 10 in FIGS. 1–2 can also be provided within the recesses and projecting from the bottom wall 18 with core or molding projections 50 which extend into the interior of the hollow thermoplastic profiles 14 as shown. The provision of these projections 50 assures that precisely defined and configurated internal beads 26'' will form in the interior of the profiles 14 as the material thereof becomes softened in response to contact with the plate 10''. This, in turn, assures that a precisely configurated and dimensioned cross-sectional surface area is available on each end portion 14 of the respective profile 14 for welded connection of the profiles with one another. This means that an increase in the strength of the welds thus obtained will be achieved. Depending upon the spacing between the outer contours of the projections 50 and the inner contours of the recesses 12 within whose inner circumferential surfaces the projections 50 are located, the particular configuration and dimension of the internal beads 26'' can be controlled as desired.

Coming to the embodiment illustrated in FIGS. 6–9, it will be seen that here the heated element is in form of a plate 10''' which is again provided with embedded heating means, for instance electrical resistance heating elements which are not shown. Here, however, the opposite sides of the plate 10''' are provided with outer plate elements 10a each provided with a recess 12''' corresponding to the recesses 12 of FIGS. 1 and 2. The plates 10a are connected to the plate 10''' by means of hinges 62 so that they can be pivoted into and out of contact with the respective sides of the plates 10'''. The contour of the recesses 12''' is of course again precisely coincident with the outer contour of the profiles 14, and FIG. 7 shows that the inlets of the recesses 12''' are inwardly bevelled as discussed before, to facilitate insertion of the profiles 14.

According to the present invention the plates 10a may be configurated of plate portions 60 composed of a material having poor thermal conductivity and being of such character that the softened thermoplastic material of the profiles 14 will not adhere to it. Such a material may be tetrafluoroethylene or another suitable material. However, this type of material usually does not have any significant mechanical strength. Because of this it is advantageous to provide carrier plate portions 61 each of which carries one of the plate portions 60 and supports it and reinforces it. It is these carrier plate portions 61 which may be of sheet metal or the like, that are connected by the hinges 62 with the plate 10'''.

It is advantageous if the plate 10''' is provided with two projections 50a (only one shown) on its opposite sides so located that they will be within the respective recess 12''' when the plates 10a are moved into contact with the plate 10'''. These projections 50a correspond to those discussed with respect to the embodiment of FIG. 5 and are each bounded by a circumferentially extending inclined surface 57 the outer or maximum contour of which corresponds to the outer contour of the profiles 14 which are to be connected, and the inner contour of which is advantageously located approximately in coincidence with the inner side of the walls of the respective profiles 14. In other words, the width of the surface portion 57 is approximately equal to the thickness of the walls bounding the profiles 14. It has been found in tests that it is particularly advantageous if the extent to which these projections 50a extend outwardly from the plate 10''' corresponds to approximately one-quarter of the width of the surface portion 57, and thereby to approximately one-quarter of the thickness of the walls of the profiles 14.

The method according to the present invention and the operation of the novel arrangement will now be described with reference to the embodiment of FIGS. 6–9. Firstly, the plates 10a are moved into abutment with the plate 10''', and thereupon the workpiece holders 25 (see FIG. 2) are used to move the profiles 14 into the recesses 12''' in the direction of the arrows 24. Initially the end faces of the profiles 14 come in contact the projections 50a at the inner edge bounding the interior of the respective profile 14, as seen in FIG. 7. From this inner edge, the heat of the plate 10''' enters into the material of the profiles 14, softening the same increasingly from the inner edge towards the outer edge or outer sides of the walls of the respective profiles 14. As the softening progresses, the ends or end portions of the profiles 14 enter deeper into the recesses 12''', reaching the position shown in FIG. 8 and finally reaching the position shown in FIG. 9. In FIG. 9 it is clearly evident that the depressions defined by the inclined surface portions 57 bounding the projections 50a will be filled with a bead of inwardly displaced softened thermoplastic material of the respective profiles 14, the bead being identified with reference numeral 26'''. The zone in which the synthetic plastic material of the profiles 14 is softened is designated with reference numeral 27''''.

When the profiles have reached the position shown in FIG. 9 they are retracted out of the recesses 12''' in direction opposite to the arrows 24, and the plate 10''' with the plates 10a is moved out of the way. The softened ends of the profiles 14 are now inserted into a welding jig, such as the welding jig shown in FIG. 3 and designated with reference numeral 28, and once they have been abutted their material is allowed to cool and thus to join them together by heat welding.

Before the next welding operation is to take place, that is before further profiles 14 are to be inserted into the recesses 12''', the operator will move the plates 10a to the position shown in FIG. 6, and thereupon wipe the surface portions 57 of the projections 50a as well as the interior of the recesses 12''', in order to remove any synthetic plastic material of the profiles 14 which might be adhering to them. He then moves the plates 10a back into contact with the plate 10''' and the next welding operation can begin.

It should be pointed out that it is possible to dispense with the hinges 62 and in their place to use guides or similar elements in which the plates 10a are for instance mounted for sliding movement into and out of engagement with the opposite sides of the plate 10'''.

Coming, finally, to the embodiment in FIG. 10, it will be seen that this is concerned with an application where it is desired to weld the ends of profiles 14 whose longitudinal axes extend at an angle to one another rather than being in axial alignment. In this case, the recesses 12'''' in the heated element 10'''' must of course be appropriately configurated so as to accommodate the inclined ends of the profiles 14 as suggested in the diagrammatic illustration of FIG. 10.

Moreover, when the profiles 14 are pressed against the element 10'''' and into the recesses 12'''' at an angle as shown in FIG. 10, a slight outward movement of the profiles 14 will take place which must be taken into consideration in view of the particular configuration and shaping of the recesses 12''''. For this purpose it is advantageous to mount the element 10'''' so that it can be displaced in the direction of the arrows 55, 56 and will yield to pressure exerted by the profiles 14. Biasing means, here illustrated in form of a spring 54, is provided which bears upon the element 10'''' and against a stationary portion 52 (for instance a machine frame or the like) and which permanently tends to shift the element 10'''' to its normal rest position but permits the element to be displaced out of the rest position in the direction of the arrow 55 when pressure is exerted by the profiles 14. As soon as the profiles 14 are removed, the spring 54 restores the element 10'''' to its rest position.

In the embodiment of FIG. 10 there will of course also be provided a welding jig such as the one identified with reference numeral 28 in FIG. 3, except that the configuration of the passage in this jig must be accommodated to the configuration of the inclined ends on the profiles 14, so that they can be brought into abutment with one another and their material on hardening can unite them.

It will be understood that each of the elements described above, or two or more together, may also find a useful application in other types of constructions differing from the types described above.

While the invention has been illustrated and described as embodied in an arrangement for joining the ends of thermoplastic profiles by heat welding, it is not intended to be limited to the details shown, since various modifications and structural changes may be made without departing in any way from the spirit and concept of the present invention.

Without further analysis, the foregoing will so fully reveal the gist of the present invention that others can by applying current knowledge readily adapt it for various applications without omitting essential features of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for joining the ends of thermoplastic workpieces by heat-welding, comprising a heated element having two opposite sides each provided with a recess whose contour corresponds to the exterior contour of the ends to be joined; a welding jig also having two opposite sides and provided with a passage which connects the same and whose contour also corresponds to the exterior contour of the ends to be joined; and operating means for holding the workpieces to be joined and for moving said ends first into the respective recesses and into contact with said heated element so that the thermoplastic material of said ends softens in response to such contact, then retracting the ends from said recesses so that said welding jig may be substituted for said heated element, and thereupon abutting said ends in said passage of said welding jig so that the softened material joins the abutted ends in response to its hardening while said ends are located in said passage of said welding jig.

2. An arrangement as defined in claim 1, said heated element comprising a heated center member, and a pair of plate members each provided with one of said recesses and each movable into and out of contact with said heated center member.

3. An arrangement as defined in claim 2; and further comprising hinge means connecting said plate members with said center member for hinged displacement into and out of engagement with the same.

4. An arrangement as defined in claim 2; and further comprising guide means engaging said plate members and guiding them for sliding movement into and out of engagement with said center member.

5. An arrangement as defined in claim 2, wherein said plate members are at least in part of material having poor thermal conductivity and to which the softened thermoplastic material tends not to adhere.

6. An arrangement as defined in claim 5, wherein each of said plate members comprises a first plate of said material having poor thermal conductivity, and a juxtaposed second reinforcing plate.

7. An arrangement as defined in claim 1, each of said recesses having a bottom wall and a circumferential side wall, at least said bottom wall being heated; and further comprising thermally insulating means provided on said circumferential side wall.

8. An arrangement as defined in claim 1, each of said recesses having a bottom wall and a circumferential side wall, at least said bottom wall being heated and composed of thermally conductive material; and wherein said circumferential side wall is at least in part composed of thermally insulating material.

9. An arrangement as defined in claim 1, said recesses each having a bottom wall and a circumferential side wall; and further comprising a molding projection extending from the respective bottom wall within the confines of the associated side wall and having a contour corresponding to the interior contour of the ends to be joined.

10. An arrangement as defined in claim 9, said molding projections each being bounded by a circumferential edge face tapering inwardly and in direction away from the respective bottom wall and having a width which is at least equal to the wall thickness of the ends to be joined.

11. An arrangement as defined in claim 1, said recesses each having one outer inlet end bounded by an inwardly converging bevelled inner circumferential surface portion.

12. An arrangement as defined in claim 1, wherein said heated element is mounted for displacement in a plane paralleling its opposite sides to and from a normal rest position; and further comprising biasing means permanently urging said heated element to said normal rest position.

* * * * *